Patented Nov. 9, 1948

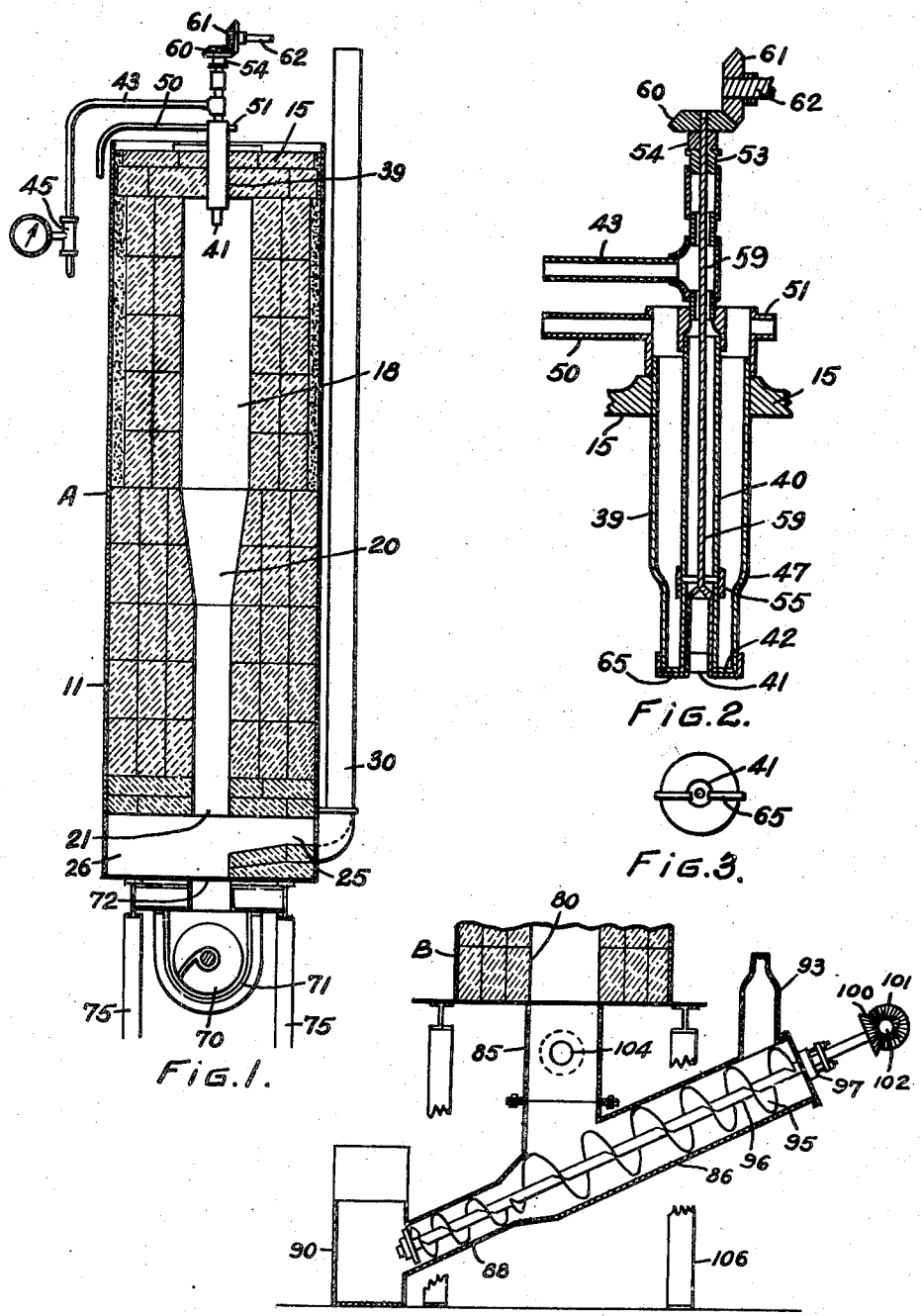

2,453,440

UNITED STATES PATENT OFFICE 2,453,440

CARBON BLACK

Charles Kaufmann and Ronald H. Hall, Shawinigan Falls, Quebec, Canada, assignors to Shawinigan Chemicals Limited, Montreal, Quebec, Canada, a corporation of Canada Application April 12, 1944, Serial No. 530,638
In Canada May 11, 1943

2 Claims. (Cl. 23—209.4)

INTRODUCTION

This invention relates to the production of carbon black and more particularly to the production of a carbon black having special characteristics.

For certain critical uses, carbon black must have particular properties such as chemical purity, high conductivity, the ability to absorb liquids to a high degree, the capacity to maintain form stability or stiffness in the presence of liquids, and uniformity in these respects. Of these properties, the present invention is particularly concerned with absorptive capacity and stiffness.

Absorptive capacity and stiffness apparently depend upon at least two properties (1) pore space and (2) the resistance of the aggregates of particles to being broken or crushed during their use in manufacturing operations, for one instance, in the making of dry cells. These values in the black may be measured quite accurately by a standard test, which has recently been adopted in the art. According to this test, a weighed quantity usually 5 grams, of the black, is placed in an Erlenmeyer flask. Carbon tetrachloride is added slowly in small portions from a measuring burette while the flask is shaken in a rotary direction. The flask is stoppered except for the brief periods necessary to add the contents. In shaking, the black is pounded against the walls of the flask and densification takes place. The black gradually forms into little balls and after further addition of carbon tetrachloride coalesces into one single ball. This is taken as the end point. The amount, in cubic centimeters, of carbon tetrachloride added is herein termed the "absorption and stiffness value" or simply the "A. S. value." This test is an accurate index of important characteristics of the carbon black for special industrial uses, and therefore, characterizes definitely the nature of the material.

The invention has particularly to do with the applicants' discovery of a new carbon black having a definite A. S. value within a desirable high range, and preferably a uniformity or homogeneity in which the A. S. value of the black does not vary appreciably throughout the mass. These properties give the black an extraordinary capacity to maintain its natural structure when subjected to mechanical pressure of an order which might be expected to disintegrate it. This material occurs in masses made up of characteristic agglomerates of acicular or fibrous particles having microscopically a lace-like appearance. These particles are of substantially pure carbon having an exceptionally high purity and electrical conductivity. The new black is preferably produced by the thermal decomposition of acetylene as will be described.

OBJECTS

Having regard to the foregoing, it is a principal object of the invention to provide a carbon black having new and useful characteristics. It is another object of the invention to provide a black having a definite A. S. value within a desired range. It is a further object to provide a black in which the absorption and stiffness value is within a high range. It is a further object to provide a black of this nature which is highly uniform throughout the mass, not varying in A. S. capacity more than a few cubic centimeters of carbon tetrachloride (per 5 grams). It is a further object to provide a black of this nature in which the degree of absorption and stiffness value and the uniformity of the black is within the range acceptable for the manufacture of high grade dry cell batteries. It is a further object of the invention to provide a process in which the black can be produced from readily available starting gas. A more specific object is to provide a process of producing this black from acetylene. Further objects are to provide a process in which the yield is extremely high, the productive rate is high and the steps are convenient to carry out. A further object is to provide suitable apparatus for the economical accomplishment of the process on a commercial scale.

THE CARBON BLACK

The applicants' preferred carbon black is a light flocculent material made up of masses of particles. It is substantially pure that is to say, between about 99% and about 99.8% carbon. It may contain traces of moisture that is, usually from about .3% to about .5% and traces of hydrocarbons. X-ray spectrographic analysis shows the black to have a more or less graphite structure, responsible for its high conductivity. By microscopic examination this black is seen to be made up of substantially lace-like acicular or fibrous aggregates of particles of carbon. In general, the mean diameter of the particle in a mass of black according to the present invention, measured by the electron microscope is in the neighborhood of 43 milli-microns with about 70% of particles varying between about 25 and about 60 milli-microns. This structure results in the material having an extremely large surface area calculated generally at about 65 square metres per gram.

The lace-like form of the aggregates is thought to be responsible for the extremely highly absorptive form-stable structure of the bulk material, the nature of which can be controlled according to the present invention within fine limits. The bulk material has preferably, on formation, an absorption and stiffness (A. S.) value of above about 30 cc. of carbon tetrachloride (per 5 grams) when measured by the test described above. This A. S. value can be increased to about 50 cc. or more (per 5 grams). The nature of the preferred material as described herein is also such that it is most homogeneous throughout its mass in that the A. S. value does not vary more than a few cubic centimeters usually between about 3 cc. or even less (per 5 grams) to about 5 cc. (per 5 grams) which is well within the variation of up to about 10 cc. (per 5 grams) which is usually acceptable for one of the most critical uses of the black, namely, as a constituent of the depolarizing mix of high grade dry cell batteries. One characteristic black has an A. S. value of about 40 cc. (per 5 grams) and does not vary more than about 3 cc. (per 5 grams) in uniformity.

The apparent density of the material, on formation is usually in the range of about .75 lb. per cu. ft. to about 1 lb. per cu. ft. It is usual for the purposes of shipping to compress the black so as to increase its density. The applicants' product has the extraordinary capacity of being capable of being compressed to a reasonable extent without a serious drop in A. S. value. In the carbon black trade the product is usually shipped at a density of either about 6¼ lbs. per cu. ft. or about 12½ lbs. per cu. ft. The latter value is usually arrived at by compressing it twice, as for instance in a plunger press, with precautions taken so as not to subject the black to any more friction than necessary. That is to say, the black as it comes from the retort usually weighs from about .75 to about 1 lb. per cu. ft. After the first compression the density is about 6¼ lbs. per cu. ft. and finally, after the second compression, the density is about 12½ lbs. per cu. ft. Compressing reduces the A. S. value slightly. For instance, a black having an A. S. value of about 30 cc. (per 5 gms.) on formation will have an A. S. value of about 28 cc. (per 5 gms.) when compressed to a density of about 6¼ lbs. per cu. ft. and about 24 cc. (per 5 gms.) when compressed to a density of about 12½ lbs. per cu. ft. Black having an A. S. value of about 50 cc. (per 5 gms.) on formation will, when compressed to about 6¼ lbs. per cu. ft. have an A. S. value of about 40 cc. (per 5 gms.) and when compressed to about 12½ lbs. per cu. ft. about 32 cc. (per 5 gms.). Intermediate A. S. values will, on compression, be reduced substantially proportionately. Where the material coming from the retort has a homogeneity, that is to say, a variation in A. S. value of less than about 3 cc. the compressed material will have an equal or lesser variation. The material is usually packed for shipping in paper bags each containing either about 6¼ lbs. or 12½ lbs. and a volume of about one cubic foot.

Black according to the invention is extraordinarily conductive, having resistances (reciprocal to conductivity) of between about .04 ohm and about .045 ohm per cubic inch at about 2000 pounds pressure per square inch. It is capable by its structure and form-stability of maintaining this conductivity when inter-mingled with other materials, as for instance, when used as an absorbent for the electrolyte in dry cell batteries, or as a filler, for instance in rubber or plastics. This characteristic apparently results from the fact that the black is present in the form of chain-like aggregates many times greater in length than in diameter and that the actual contact between the aggregates forms an electrically conductive network throughout the material with which it is compounded. The lack is also very buoyant in water and difficult to wet.

PRODUCTION

The preferred process of producing the black, that is, by the thermal decomposition of acetylene or other suitable endothermic gases is dependent upon determinants unfamiliar to the art. Since these determinants are relatively complex and there are numerous variables involved, it will be necessary to enter into some detail as to this preferred manner of preparation. Accordingly, a suitable plant for this purpose and a preferred process as carried out in this plant will now be described.

This detailed description is illustrated by the accompanying drawings, in which:

Figure 1 is a vertical cross sectional view of an apparatus conveniently suitable for the production of black according to the invention, including a retort and an inlet unit for supplying gas thereto.

Figure 2 is an enlarged vertical cross sectional view of the gas inlet unit of the apparatus shown in Figure 1.

Figure 3 is a bottom plan view of the inlet unit shown in Figure 1.

Figure 4 is a vertical cross sectional view of an alternative form of gas residue disposal arrangement for use in conjunction with an apparatus similar to that shown in Figures 1 and 2.

RETORT

Figure 5:
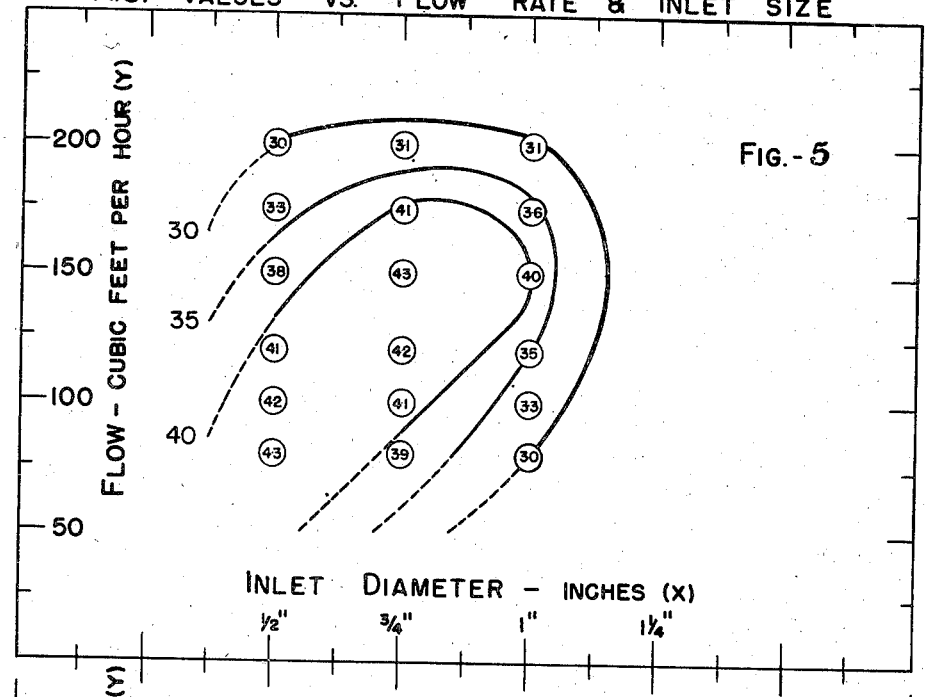
Figures 5 and 6 are graphical illustrations showing the A. S. values obtained using an eleven inch retort and a twenty-two inch retort respectively.

Referring, therefore, more particularly to Figures 1 through 4 of the drawings, A is an enclosed cylindrical retort, preferably vertically disposed, for dissociating the elements of the endothermic gas, collecting the carbon as "black" and burning the hydrogen. The retort A has a lining of suitable refractory material such as fire brick and a steel shell 11. In the preferred embodiment indicated, the retort is cylindrical in form and of dimensions suitable, as will be more fully explained, for the production of black of the special characteristics defined above. It is vertically disposed and closed at its upper end by a removable top 15. The upper portion 18 is of substantially constant diameter. The lower end 20 of the retort is tapered to increase the velocity of the gas and to minimize the possibility of air entering and terminates in an outlet 21. The portions 18 and 20 constitute the dissociation chamber. Usually for commercial production a series of retorts of this construction are arranged in batteries.

A large flue 25 extends below the retort from the front to the back thereof and is in communication with the outlet 21. This flue is open at the front 26 for the entrance of air and for observation and communicates at the rear through suitable connecting means with an upwardly extending stack 30 for drawing off gases.

INLET UNIT

At the upper end of the retort, an inlet unit 39 is supported by the cover 15. This unit is axially aligned with the retort and enters the latter through an air-tight opening in the cover. The unit comprises a central metallic tube or passage 40 for the entering gas. The upper end of the pasasge 40 is connected to a gas line 43 controlled by a Venturi meter 45 for measuring accurately the amount of gas fed and assuring a constant flow to the retort at a predetermined rate. A gas line leads from a pump (not shown) to the meter 45 so that the gas may be pumped at a constant rate of flow and under pressure. This enables the gas to be fed at a constant rate independent of conditions within the retort, such as for instance, back pressures, etc. The lower end 41 of the tube 40 constitutes an inlet nozzle. Surrounding the tube 40 is a metallic casing or jacket 47 which is connected to the cover 15 and has a horizontal lower end 42 joined to the end 41. Connected to the jacket there leads a water supply pipe 50 and a water outlet 51. A supply pipe 50 is connected to a suitable source of water supply, preferably cold water adapted to cool the entering gas, so as to lessen the possibility of polymerization and deposition of carbon adjacent the inlet, and to prevent damage to the inlet structure.

CLEANING DEVICE

Extending upwardly from the upper end of the tube 40 is a structure including a packing box 53 forming a seal, and a bearing 54. Adjacent the foot of the tube 40 is a spider bracket 55 including a bearing. A vertical shaft 59 journalled in the brackets 54 and 55 extends throughout the height of the inlet unit. At the upper end of the shaft is driving means including a bevel gear 60 meshing with a bevel gear 61 on a horizontal shaft 62 held in a suitable bearing (not shown) and driven from a suitable source of power (not shown). On the lower end of the shaft 59 is mounted a scraping arrangement adapted effectively to free the inlet 41 and surrounding surfaces from carbon which tends to build up during the reaction. This arrangement consists of substantially L-shaped scrapers 65 made of suitable metal and adapted to fit snugly against the walls of the tube 40 to engage the horizontal portion between the end of the tube 40 and the jacket 47 and to extend a short distance upward outside the jacket 47. The top end of each of these scrapers is suitably and firmly attached to the lower end of the shaft 59. The various parts are constructed of suitable materials for fulfilling their respective functions.

Underneath the retort is a collecting means including a transversely extending screw conveyor 70 operating in a trough 71 adapted to catch solids falling through an opening 72 directly underneath the outlet 21 of the retort. The entire structure is held on supports 75.

ALTERNATIVE STRUCTURE

An alternative structure for the collecting and residual gas disposal features is shown in Figure 4 whereby the gas constituent given off from the dissociation may be collected instead of burned. This structure includes a cylindrical retort B similar to the retort A. In this case, however, the lower end 80 of the retort is of the same diameter as the upper end, e. g. is not tapered, although it may be tapered if desired. A discharge chute 85 leads downwardly from the bottom of the retort and meets the middle portion of a sloping conveyor tube 86. This tube is connected at its lower end 88, which is preferably of reduced diameter, with a water seal 90. The upper end of the tube 86 includes a gas outlet 93. Adapted to operate in the tube 86 is a screw conveyor 95 having a shaft 96 held in bearings 97 and 99, one at each end of the tube. The shaft 96 extends outwardly from the upper end of the tube and is provided on that end with a bevel gear 100 meshing with another bevel gear 101 on a shaft 102, driven from a suitable source of power (not shown). The retort B is mounted on suitable supports 106 which have been partially broken away to show the collection mechanism. An outlet 104 is provided in the chute 85 which may be used as a flue so that the retort may be converted to burning the residual gas instead of collecting it. When collecting the residual gas this outlet is closed.

OPERATION

The retort is heated to decomposition temperature of the gas by any suitable means, as for example, by combustion of the acetylene by means of air. After the decomposition temperature has been established, gas is fed under pressure sufficient to ensure a uniform steady flow at a desirable rate from storage through the meter 45 down the tube 40 into the retort. A preferred pressure is about 1.5 lbs. per sq. in. above atmospheric. The gas supply is carefully regulated and controlled by the use of the meter 45 to achieve a suitable substantially constant rate of flow from the inlet 41 into the retort. Dissociation of the gas into its components carbon and hydrogen takes place whereupon large flakes of flocculent black appear at the bottom of the retort. The continuous input of gas serves to expel the hydrogen and black through the outlet 21 in the case of retort A or the outlet 80 in the case of retort B.

In retort A the hydrogen is ignited at the outlet 21 and the resulting combustion gases together with the black and excess air are drawn by suction into the collection pipe 30. In the case of retort B, the hydrogen finds its way, in this case, without being ignited or mixed with air through the gas outlet 93, while the black is transported by a screw conveyor in the opposite direction through the conveyor tube 86 and a water seal 90. Owing to its buoyancy the black immediately floats to the top of the water and passes along its surface to suitable collecting means. Air is effectively excluded from mixing with the hydrogen by the water seal.

As the process proceeds, the scraping device 65 is operated to keep the inlet 41 substantially free from carbon which would otherwise tend to build up on this inlet. This not only maintains the size of the inlet constant, but also serves to maintain the uniformity of the black as regards quality.

NECESSARY CONDITIONS

According to the invention, various conditions are established to produce black of the characteristics described above. These conditions include coordination of the dimensions of the retort, the dimensions of the gas inlet, nature of gas, the rate of flow, the uniformity of the rate of flow, adequate and continual cleaning of the inlet, which the applicants have observed have an unexpectedly marked bearing on the A. S. value of the product.

NATURE OF GAS

The gases employable as starting materials are endothermic gases, that is to say, gases whose dissociation produces an exothermic reaction. The preferred gas is acetylene. Other such gases may also be used, for instance, mixtures of acetylene and ethylene or similar hydrocarbon gases. However, the addition to the acetylene of ethylene or other gases reduces the yield and also affects the quality of the black, especially its adsorption and stiffness value. Also, the more the acetylene is diluted the greater tendency to form coke on the inlet and on the retort walls. For practical purposes, however, as much as about 25% of ethylene, or similar hydrocarbons can be used in mixture with about 75% acetylene without reducing the quality of the black substantially below the above-mentioned standards. It is also advantageous that the gas be as free as possible from moisture. Moisture in the gas has the principal effect of reducing the yield of black.

RETORT SIZE

Within practical limits, the diameter of the retort may vary greatly. It is not considered practical to use retorts below about 6 inches in internal diameter because they tend to become blocked with black. Extremely practical operations have been carried out in retorts of about 11 inches and about 22 inches in internal diameter respectively. Retorts of larger diameter may also be employed. For practical purposes, therefore, the permissible diameter of the retort may be considered as variable from about 6 inches and upwards to within the limits of mechanical, constructional, and operational difficulties involved. Commercially, it is usually more feasible to use a battery of smaller retorts rather than a single large retort. A preferred height for either the 11 inch or the 22 inch retort is between about 3 and about 9 feet from the inlet 41 to the outlet 21 and in this and other sized retorts the height may remain the same or vary.

INLET SIZE

The applicants have also found that the cross-sectional area of the gas stream, i. e. the internal diameter of the gas inlet is of distinct importance in terms of the quality of the black produced, but this dimension must, of necessity, be considered in conjunction with the rate of flow of the gas. Indicated specifically in the examples are the results of a series of runs showing how the applicants have been able to increase the absorption and stiffness value of the black by varying the size of the gas inlet in the particular retort. For instance, with an 11 inch retort, the inlet size should be from about ½ inch to about 1 inch in inside diameter to achieve uniform black having an A. S. value within the range of between about 25 cc. (per 5 gms.) and about 50 cc. (per 5 gms.) continuously at a high production rate. The preferred inlet size for an 11 inch retort is about ¾ inch. With a 22 inch retort, the inlet size should be within the range of from about ½ to about 1½ inches, continuously to produce black of the high quality made possible by the present invention. The preferred size for a 22 inch retort is about 1 inch. As will be seen, the permissible size of the inlet will also depend on the rate of gas flow.

RATE OF FLOW

The rate of flow is similarly tied up with the size of the retort and with that of the gas inlet. Experience has shown that there is an acceptable range of flow for each inlet size and that within this range there is a specific flow rate at which the optimum grade of black is produced, as may be seen from Table I, Examples 1 to 42.

The lowest flow rate, where operating temperature is maintained entirely by the heat given off in the reaction is the lowest rate at which sufficient heat is developed to maintain decomposition temperature.

FREEING OF CARBON DEPOSITS

Besides the mentioned determining factors in the production of a black having the desirable absorptive characteristics, experiments have shown that coke formation resulting from polymerization reactions etc. adjacent the gas inlet has a distinct lowering effect on the absorptive and stiffness value. Consequently, without adequate and continuous cleaning in the vicinity of the inlet, it has been found that a uniform black cannot be produced with any continuity. It is, therefore, imperative that deposited carbon is not allowed to build up around the end of the inlet. According to the present invention, the inlet is effectively kept free of coke by a mechanical scraping device a specific embodiment of which has already been described. It is important that a device of this nature or its equivalent be employed for the removal of coke, effectively to prevent any substantial lowering or variation in the A. S. value of the black produced. Another expedient assisting in keeping the apparatus free from coke is the cooling of the entering stream of acetylene until it enters the retort. This is accomplished by the water-jacketed inlet.

Previous means of preventing coke formation have included the use of a stream of air adapted to surround the gas stream adjacent the zone at which it enters the retort. This expedient may be employed with the other phases of the present invention, but the applicants have found that in any case for acceptable results in producing black of the characteristics specified, a mechanical cleaning device should be employed and that for preferred results, a mechanical scraper without the air stream is preferable. In any event, the accumulation of carbon adjacent the inlet should be reduced substantially to a minimum. The air stream has the advantage of reducing the yield.

PRODUCTION RATE AND YIELD

Under conditions substantially as described above, the usual production rate in an eleven inch retort varies between about 6 to about 10 pounds of black per hour for the A. S. values within the required range. In a twenty-two inch retort this rate varies between about 24 and about 30 pounds of black per hour for the A. S. values within the required range. Qualitatively, the most desirable production rate may be defined as substantially the maximum possible, commensurate with the production of a material within the range of absorption and stiffness value required. The yield of each calculated on the theoretical carbon available in the gas is good, usually between about 95% and about 99%.

INTER-RELATION OF CONDITIONS

Since most of the variables involved in this process are inter-related and some are selected at will for convenience or expediency, it is impractical to give the entire range of numerical limits of each process factor. Variations of flow rates in relation to various characteristic inlet and retort sizes are given in Examples 1 to 42. From these examples, it is evident that there is an optimum flow rate for each retort and inlet combination at which the A. S. value of the black produced is substantially at a maximum.

EXAMPLES

Now that the determining factors in producing black according to the present invention have been defined, these factors will be illustrated in further detail by reference to examples citing actual specific procedures carried out in apparatus similar to the above and according to the following dimensions and conditions. It should be understood that the quantitative data given are not to be taken in a limiting sense, but merely as exemplary of preferred operating conditions.

Runs were carried out in brick-lined retorts of substantially the relative dimensions of the retort A noted in the drawings and as qualified below. Two retorts were employed, in one of which the dissociation chamber had a diameter of about 11 inches and the other of which had a diameter in the upper portion 18 of about 22 inches. The height of each retort from underside of top 15 to bottom of outlet 21 was about 9 feet. The purpose of the runs was to determine in terms of A. S. value the substantially optimum condition, i. e. cross sectional area of the entering gas stream taken in conjunction with the rate of flow.

Runs were carried out substantially according to the conditions and with substantially the results indicated in the following table. It should also be noted that the variation in A. S. value throughout the mass in each of the examples given was less than about 3 cc. (per 5 gms.). The run were each of about 24 to about 48 hours' duration.

TABLE I

*11 inch retort*

| Ex. No. | Gas Inlet Size | Rate of Gas Flow, cu. ft./hr. | Average A. S. Values |
|---|---|---|---|
| 1 | ½″ inlet | 80 | 42.9 cc. (per 5 gms.). |
| 2 | do | 100 | 42.0 cc. (per 5 gms.). |
| 3 | do | 120 | 41.0 cc. (per 5 gms.). |
| 4 | do | 150 | 37.7 cc. (per 5 gms.). |
| 5 | do | 175 | 33.4 cc. (per 5 gms.). |
| 6 | do | 200 | 29.9 cc. (per 5 gms.). |
| 7 | ¾″ inlet | 80 | 38.6 cc. (per 5 gms.). |
| 8 | do | 100 | 40.5 cc. (per 5 gms.). |
| 9 | do | 120 | 42.0 cc. (per 5 gms.). |
| 10 | do | 150 | 42.6 cc. (per 5 gms.). |
| 11 | do | 175 | 40.6 cc. (per 5 gms.). |
| 12 | do | 200 | 30.8 cc. (per 5 gms.). |
| 13 | 1″ inlet | 80 | 29.5 cc. (per 5 gms.). |
| 14 | do | 100 | 32.5 cc. (per 5 gms.). |
| 15 | do | 120 | 35.3 cc. (per 5 gms.). |
| 16 | do | 150 | 40.1 cc. (per 5 gms.). |
| 17 | do | 175 | 35.8 cc. (per 5 gms.). |
| 18 | do | 200 | 30.6 cc. (per 5 gms.). |

*22 inch retort*

| Ex. No. | Gas Inlet Size | Rate of Gas Flow, cu. ft./hr. | Average A. S. Values |
|---|---|---|---|
| 19 | ½″ inlet | 300 | 41.0 cc. (per 5 gms.). |
| 20 | do | 400 | 34.5 cc. (per 5 gms.). |
| 21 | do | 500 | 27.3 cc. (per 5 gms.). |
| 22 | do | 600 | 20.5 cc. (per 5 gms.). |
| 23 | do | 700 | 15.0 cc. (per 5 gms.). |
| 24 | do | 800 | |
| 25 | ¾″ inlet | 300 | 42.3 cc. (per 5 gms.). |
| 26 | do | 400 | 42.0 cc. (per 5 gms.). |
| 27 | do | 500 | 37.0 cc. (per 5 gms.). |
| 28 | do | 600 | 26.0 cc. (per 5 gms.). |
| 29 | do | 700 | |
| 30 | do | 800 | |
| 31 | 1″ inlet | 300 | 35.0 cc. (per 5 gms.). |
| 32 | do | 400 | 40.0 cc. (per 5 gms.). |
| 33 | do | 500 | 39.2 cc. (per 5 gms.). |
| 34 | do | 600 | 31.9 cc. (per 5 gms.). |
| 35 | do | 700 | 24.0 cc. (per 5 gms.). |
| 36 | do | 800 | 17.6 cc. (per 5 gms.). |
| 37 | 1¼″ inlet | 300 | 26.0 cc. (per 5 gms.). |
| 38 | do | 400 | 29.0 cc. (per 5 gms.). |
| 39 | do | 500 | 29.7 cc. (per 5 gms.). |
| 40 | do | 600 | 24.6 cc. (per 5 gms.). |
| 41 | do | 700 | 21.6 cc. (per 5 gms.). |
| 42 | do | 800 | 17.0 cc. (per 5 gms.). |

It is to be observed from Table I that employing an 11 inch retort and ½ inch inlet at flow rates from about 80 cu. ft. per hr. to about 175 cu. ft. per hour, the A. S. value of the black produced is within a high range, but tapers off at the higher gas flow so that if this flow is further increased, the A. S. value is lowered below about 30 cc. (per 5 grams). Similarly with the ¾ inch inlet at flow rates from about 80 cu ft. per hr. to about 200 cu. ft. per hr. the A. S. value is above about 30 cc. (per 5 grams). Above 200 cu. ft. per hr. this value tapers off to below 30 cc. With a 1 inch inlet at a flow rate of about 80 cu. ft. per hour, the A. S. value is about 30 cc. (per 5 grams), but at 100 cu. ft. per hr. rises until a flow rate of about 150 cu. ft. per hr. is reached and at above 200 cu. ft. per hour it falls below 30 cc. (per 5 grams).

Hence, in selecting suitable retort and inlet sizes two factors are important, (1) the A. S. value desired and (2) the production rate. In general, therefore, it might be said that where A. S. value anywhere above about 30 cc. per 5 grams is desirable, it might be considered best to use a ¾″ inlet since with this size relatively high A. S. values can be achieved at flow rates of between about 100 cu. ft. and about 200 cu. ft. per hr. With the 1 inch inlet, these flow rates can be employed but the values are not quite so high. With the ½″ inlet, with a flow of about 200 cu. ft. per hr. the A. S. value of the black is about 30 cc. (per 5 grams).

Similar observations may be made on the 22 inch retort. The use of this size may be considered advantageous since it is to be observed that higher flow rates are possible while relatively high A. S. values may still be achieved. A ¾″ inlet appears as advantageous since flow rates of between about 300 cu. ft. and 500 cu. ft. per hr. may be employed to achieve A. S. values of between about 37 cc. and about 42 cc. (per 5 grams). Hence while obtaining as good A. S. values it is possible to achieve production rates from twice to three times those possible with the 11 inch retort. Larger retorts may also be used with higher flow rates possible but it is generally more convenient to employ batteries of the smaller retorts.

Figure 6:
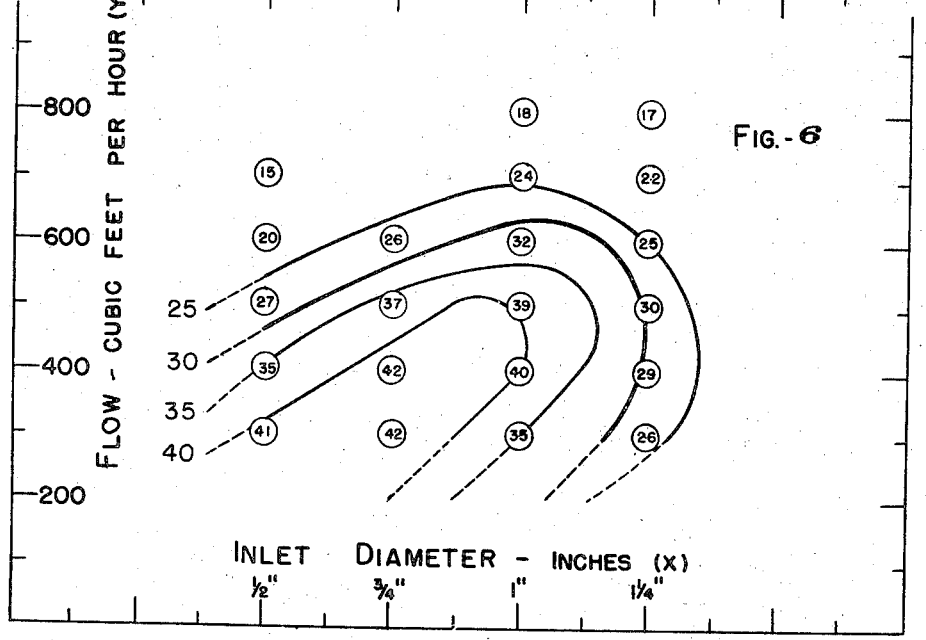

For convenience of inspection the data of Table I are presented in the drawings. In Figure 5, which refers to the eleven inch retort, the A. S. values (rounded off to the nearest whole number) are shown in circles at the values of inlet diameter in inches (as abscissae, $x$) and gas flow in cubic feet per hour (as ordinates, $y$) to which they refer. Contour lines for A. S. values 30, 35, and 40, interpolated between the indicated values, are also shown. Similarly, Figure 6 shows the data for the twenty-two inch retort, with contour lines for A. S. values 25, 30, 35, and 40. (cc. carbon tetrachloride per 5 grams of black).

EXAMPLES 43 TO 46

The following examples demonstrate the use of acetylene-ethylene mixtures according to the present invention.

A series of runs were carried out in an 11 inch diameter retort equipped with a gas inlet having an internal diameter of about ¾″. The construction of the apparatus was substantially as illustrated and described herein. The following Table II gives particulars of the gas used in each case, the apparent density in the resulting black and its A. S. value. It should be noted that the variation in A. S. value throughout the mass in each of the examples given was less than about 3 cc. (per 5 grams).

TABLE II

| Ex. No. | Gas Used | Yield | Apparent Density of Black | A. S. Value |
|---|---|---|---|---|
|  |  | Per cent | Lbs./cu. ft. |  |
| 43 | Acetylene Alone 60 cu. ft. per hr. | 98.8 | 0.92 | 38.7 |
| 44 | Acetylene Alone 117 cu. ft. per hr. | 97.0 | 0.83 | 40.9 |
| 45 | Acetylene Alone 140 cu. ft. per hr. | 95.5 | 0.91 | 37.6 |
| 46 | Acetylene 80% 100 cu. ft. per hr. Ethylene 20% 25 cu. ft. per hr. Total Flow 125 cu. ft. per hr. | 97.0 | 1.0 | 31.5 |

The runs were each of about five hours' duration.

ADVANTAGES

The advantages of the present invention will be generally evident to those skilled in the art. A carbon black is provided having new characteristics making it applicable to uses for which other blacks have no utility. Principal characteristics of the black which are unique and useful are its high absorptive capacity and the tenacity of the self-sustaining structure of the material to withstand disintegration when transported or handled in bulk. A convenient and economical process and apparatus are provided for producing this black from readily available gas.

The term "absorption and stiffness value" or "A. S. value" referred to throughout the specification is the value arrived at by the test described at paragraph 3 of the specification and for convenience is based on the capacity of 5 grams of the carbon black to absorb carbon tetrachloride when added thereto as described in said paragraph 3. This capacity is expressed in cubic centimeters of carbon tetrachloride added.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A continuous process of forming carbon black from an endothermic hydrocarbon gas comprising heating a chamber initially to a temperature at which the gas will dissociate into carbon black and hydrogen, continuously introducing the gas into the heated chamber in the form of a stream of appreciably smaller cross section than that of said chamber, cooling the gas as it is introduced into the chamber, continuously mechanically cleaning the inlet constituting the point of introduction of the gas into the chamber, the rate of introduction of the gas being effective to maintain a dissociation temperature from the heat given off in the dissociation reaction, maintaining substantially constant the rate of introduction of the stream into the chamber thereby to cause substantially uniform structural formation of the carbon black, and recovering said carbon black from the chamber.

2. A process according to claim 1 wherein the hydrocarbon gas is acetylene.

CHARLES KAUFMANN.
R. H. HALL.

REFERENCES CITED

The following references are of record in the file of this patent:

UNITED STATES PATENTS

| Number | Name | Date |
|---|---|---|
| 901,232 | Eldred | Oct. 13, 1908 |
| 986,489 | Morehead | Mar. 14, 1911 |
| 1,192,597 | Allen | July 25, 1916 |
| 1,288,400 | Fickes | Dec. 17, 1918 |
| 1,444,601 | Gander | Feb. 6, 1923 |
| 1,613,323 | Green | Jan. 4, 1927 |
| 1,614,854 | Stockstrom | Jan. 18, 1927 |
| 1,782,540 | Machtolf | Nov. 25, 1930 |
| 1,838,316 | Lewis | Dec. 29, 1931 |
| 1,881,325 | Miller | Oct. 4, 1932 |
| 1,920,352 | Brownlee | Aug. 1, 1933 |
| 1,999,541 | Keller | Apr. 20, 1935 |
| 2,121,463 | Wisdom | June 21, 1938 |
| 2,126,838 | Stoner | Aug. 16, 1938 |
| 2,134,950 | Offutt | Nov. 1, 1938 |
| 2,163,630 | Reed | June 27, 1939 |
| 2,232,727 | Peterkin | Feb. 25, 1941 |
| 2,255,059 | Houdry | Sept. 9, 1941 |

FOREIGN PATENTS

| Number | Country | Date |
|---|---|---|
| 24,256 | Great Britain | 1910 |

OTHER REFERENCES

Kaufmann, Canadian Chem. & Met., vol. 17, May, 1933, pp. 93–5.

Wiegand, India Rubber World, Dec. 1941, pp. 270–2.

Sweitzer et al., The Rubber Age, vol. 55, No. 5, Aug. 1944, pp. 469–78.